(12) United States Patent
Tekmen et al.

(10) Patent No.: US 11,113,068 B1
(45) Date of Patent: Sep. 7, 2021

(54) PERFORMING FLUSH RECOVERY USING PARALLEL WALKS OF SLICED REORDER BUFFERS (SROBS)

(71) Applicant: Microsoft Technology Licensing, LLC, Redmond, WA (US)

(72) Inventors: Yusuf Cagatay Tekmen, Raleigh, NC (US); Rodney Wayne Smith, Raleigh, NC (US); Kiran Ravi Seth, Morrisville, NC (US); Shivam Priyadarshi, Morrisville, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/986,650

(22) Filed: Aug. 6, 2020

(51) Int. Cl.
*G06F 9/38* (2018.01)

(52) U.S. Cl.
CPC .......... *G06F 9/3861* (2013.01); *G06F 9/3855* (2013.01); *G06F 9/384* (2013.01)

(58) Field of Classification Search
CPC ....... G06F 9/384; G06F 9/3855; G06F 9/3861
See application file for complete search history.

(56) References Cited

U.S. PATENT DOCUMENTS

| | | | | |
|---|---|---|---|---|
| 6,629,233 B1* | 9/2003 | Kahle | ................... | G06F 9/3013 712/217 |
| 10,445,094 B2* | 10/2019 | Beard | ................. | G06F 12/0893 |
| 2014/0281393 A1* | 9/2014 | Iyengar | ................. | G06F 9/3855 712/208 |
| 2020/0401408 A1* | 12/2020 | Burky | ..................... | G06F 9/384 |

OTHER PUBLICATIONS

Joseph Sharke, Deniz Balkan and Dmitry Ponomarev, "Adaptive Reorder Buffers for SMT Processors", Sep. 16, IEEE and pp. 244-253 (Year: 2006).*

* cited by examiner

*Primary Examiner* — William B Partridge
*Assistant Examiner* — Courtney P Carmichael-Moody
(74) *Attorney, Agent, or Firm* — Withrow & Terranova, PLLC

(57) ABSTRACT

Performing flush recovery using parallel walks of sliced reorder buffers (SROBs) is disclosed herein. In one exemplary embodiment, a register mapping circuit provides a rename mapping table (RMT) comprising RMT entries representing logical register number (LRN) to physical register number (PRN) mappings. The register mapping circuit also provides an SROB comprising multiple SROB slices that each corresponds to a respective LRN. Each SROB slice tracks uncommitted instructions that write to the LRN corresponding to that SROB slice, and maintains those instructions in program order with respect to each other. Upon detecting an uncommitted instruction writing to an LRN, the register mapping circuit allocates an SROB slice entry in the SROB slice corresponding to the LRN. When an pipeline flush from a target instruction occurs, the register mapping circuit restores RMT entries of the RMT to their prior mapping states based on parallel walks of the SROB slices of the SROB.

20 Claims, 7 Drawing Sheets

PERFORMING FLUSH RECOVERY USING PARALLEL WALKS OF SLICED REORDER BUFFERS (SROBS)

FIELD OF THE DISCLOSURE

The technology of the disclosure relates to speculative instruction execution in processor-based devices, and, more particularly, to recovering from pipeline flushes that may occur during speculative instruction execution.

BACKGROUND

One common feature of conventional modern processor devices is branch prediction, which employs mechanisms to both predict the direction of branches resulting from control flow instructions (such as conditional branch instructions), as well as enable the speculative execution of instructions on the predicted execution path. Because some branch predictions will invariably be incorrect, such branch prediction mechanisms also include hardware for recovering from the effects of speculative instruction execution resulting from mispredicted branches. To accomplish this recovery, the branch prediction mechanism must "flush" speculatively executed instructions that are younger than the mispredicted branch instruction from the execution pipeline, undo all updates performed by the speculatively executed instructions in different microarchitectural structures, and recover the original state of these structures as they existed prior to the mispredicted branch instruction. Pipeline flushes may also occur in response to other control hazards in addition to branch mispredictions. For example, an pipeline flush may have to be performed following an attempt to execute a load or store instruction for which a calculated address of a memory location is invalid or cannot be accessed.

One microarchitectural structure that is affected by flush recovery is the rename map table (RMT). The RMT, which is provided by processor devices that support register renaming, stores the most recent logical-register-to-physical-register mappings used by the processor device to establish true data dependencies. As mappings stored by the RMT may be modified by speculatively executed instructions, recovering from a flush requires each of the RMT mappings to be restored to a prior mapping state that existed when the instruction that triggered the flush ("target instruction") underwent register renaming. Restoring the RMT is a time-sensitive operation because instructions on the "correct" execution path that are fetched after the flush cannot proceed through the execution pipeline of the processor device until the RMT is restored to its prior mapping state. If the prior mapping state of the RMT is not recovered quickly enough, the processor device may be forced to stall the execution pipeline.

Existing techniques for RMT recovery may be generally classified according to the point at which the recovery process begins. Under one approach known as "lazy recovery," the recovery process does not begin until the target instruction becomes the oldest uncommitted instruction in a reorder buffer (ROB) (a queue that tracks the status of in-flight instructions in program order after register renaming). Once the target instruction is the oldest uncommitted instruction in the ROB, the RMT may be recovered simply by copying the contents of a committed mapping table (CMT) into the RMT. However, while lazy recovery is easy to implement, it can result in severely degraded processor performance in situations in which there are many older uncommitted instructions at the time the flush was initiated.

Another approach known as "immediate recovery" involves beginning the recovery process as soon as the flush is initiated. Some immediate recovery mechanisms may make use of RMT snapshots, which may be created for each branch instruction and used to restore the RMT if the corresponding branch instruction is determined to have been mispredicted. RMT snapshots may be used alone, or in conjunction with "walking" the ROB (i.e., sequentially accessing entries within the ROB between the entry for the target instruction and the point at which a snapshot of the RMT was taken, and undoing the changes made to the RMT by each corresponding instruction). Other immediate recovery techniques may involve using the contents of the CMT as a starting point, and walking the ROB from the oldest uncommitted instruction towards the target instruction while undoing the changes made by each corresponding instruction. Still another immediate recovery approach involves using the contents of the RMT as a starting point, and walking the ROB from the youngest uncommitted instruction towards the target instruction while undoing changes. Generally speaking, under each of these approaches, the performance of the immediate recovery mechanism may depend on the number of snapshots required and/or the number of instructions that need to be walked to restore the RMT's prior mapping state.

Accordingly, a mechanism for more efficiently restoring the RMT following an pipeline flush is desirable.

SUMMARY

Exemplary embodiments disclosed herein include performing flush recovery using parallel walks of sliced reorder buffers (SROBs). In this regard, in one exemplary embodiment, a processor device includes a register mapping circuit that provides a rename mapping table (RMT). The RMT includes a plurality of RMT entries, each of which represents a mapping of a logical register number (LRN) to a physical register number (PRN). The register mapping circuit also provides an SROB, which includes a plurality of SROB slices. Each SROB slice corresponds to a respective LRN, and includes a plurality of SROB slice entries. Each SROB slice is similar in functionality to a conventional reorder buffer (ROB), except that the SROB slice tracks only uncommitted instructions that write to the LRN corresponding to that SROB slice, and maintains those instructions in program order only with respect to each other. In exemplary operation, the register mapping circuit, upon detecting an uncommitted instruction writing to an LRN in an execution pipeline of the processor device, allocates an SROB slice entry for the uncommitted instruction in the SROB slice corresponding to the LRN. If the register mapping circuit subsequently receives an indication of an pipeline flush from a target instruction within the execution pipeline, the register mapping circuit restores the plurality of RMT entries of the RMT to their prior mapping states based on parallel walks of the SROB slices of the SROB. Because the walks of the SROB slices are performed in parallel, and because each SROB slice is likely to contain fewer instructions than a conventional ROB, flush recovery may be accomplished more efficiently than conventional approaches.

In some embodiments, a count of the SROB slice entries within each SROB slice may be the same size as a count of ROB entries in a ROB provided by the register mapping circuit, or may be smaller than the count of the ROB entries in the ROB. In the latter case, if the register mapping circuit needs to allocate an SROB slice entry to an uncommitted instruction but no SROB slice entries are available within the appropriate SROB slice, the register mapping circuit in some embodiments may initiate a stall of the execution pipeline, causing it to stall until an SROB slice entry becomes available within the SROB slice. Some embodiments may provide that, instead of initiating a stall of the execution pipeline, the register mapping circuit may allocate the oldest SROB slice entry for the uncommitted instruction. Subsequently, if the register mapping circuit determines that the overwritten contents of the oldest SROB slice entry are necessary for flush recovery, the register mapping circuit may perform a walk of the ROB. Similarly, some embodiments may provide a partially serial ROB (PSROB) to which the oldest SROB slice entry may be evicted before being allocated for the uncommitted instruction. In such embodiments, if the register mapping circuit determines that the overwritten contents of the evicted oldest SROB slice entry are necessary for flush recovery, the register mapping circuit may perform a walk of the PSROB.

In another exemplary embodiment, a register mapping circuit in a processor device is provided. The register mapping circuit includes an RMT comprising a plurality of RMT entries each representing a mapping of an LRN among a plurality of LRNs to a PRN among a plurality of PRNs. The register mapping circuit further includes an SROB subdivided into a plurality of SROB slices each corresponding to a respective LRN among the plurality of LRNs, and each comprising a plurality of SROB slice entries. The register mapping circuit is configured to detect, within an execution pipeline of the processor device, an uncommitted instruction comprising a write instruction to a destination LRN among the plurality of LRNs. The register mapping circuit is further configured to allocate, to the uncommitted instruction, an SROB slice entry among the plurality of SROB slice entries of an SROB slice corresponding to the destination LRN among the plurality of SROB slices of the SROB. The register mapping circuit is also configured to receive an indication of an pipeline flush from a target instruction within the execution pipeline. The register mapping circuit is additionally configured to, responsive to receiving the indication of the pipeline flush, restore the plurality of RMT entries to a corresponding plurality of prior mapping states, based on parallel walks of the plurality of SROB slices corresponding to LRNs of the plurality of RMT entries.

In another exemplary embodiment, a method for performing flush recovery using parallel walks of SROBs is provided. The method includes detecting, by a register mapping circuit of a processor device, an uncommitted instruction within an execution pipeline of the processor device, the uncommitted instruction comprising a write instruction to a destination LRN among a plurality of LRNs. The method further includes allocating, to the uncommitted instruction, an SROB slice entry among a plurality of SROB slice entries of an SROB slice corresponding to the destination LRN among a plurality of SROB slices of an SROB of the processor device, wherein each SROB slice of the plurality of SROB slices corresponds to a respective LRN among the plurality of LRNs. The method also includes receiving an indication of an pipeline flush from a target instruction within the execution pipeline. The method additionally includes, responsive to receiving the indication of the pipeline flush, restoring a plurality of RMT entries of an RMT to a corresponding plurality of prior mapping states, based on parallel walks of the plurality of SROB slices corresponding to LRNs of the plurality of RMT entries.

In another exemplary embodiment, a non-transitory computer-readable medium is provided. The non-transitory computer-readable medium stores computer-executable instructions that, when executed by a processor device, cause the processor device to detect an uncommitted instruction within an execution pipeline of the processor device, the uncommitted instruction comprising a write instruction to a destination LRN among a plurality of LRNs. The computer-executable instructions further cause the processor device to allocate, to the uncommitted instruction, an SROB slice entry among a plurality of SROB slice entries of an SROB slice corresponding to the destination LRN among a plurality of SROB slices of an SROB of the processor device, wherein each SROB slice of the plurality of SROB slices corresponds to a respective LRN among the plurality of LRNs. The computer-executable instructions also cause the processor device to receive an indication of an pipeline flush from a target instruction within the execution pipeline. The computer-executable instructions additionally cause the processor device to, responsive to receiving the indication of the pipeline flush, restore a plurality of RMT entries of an RMT to a corresponding plurality of prior mapping states, based on parallel walks of the plurality of SROB slices corresponding to LRNs of the plurality of RMT entries.

Those skilled in the art will appreciate the scope of the present disclosure and realize additional embodiments thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several embodiments of the disclosure, and together with the description serve to explain the principles of the disclosure.

Figure 1:
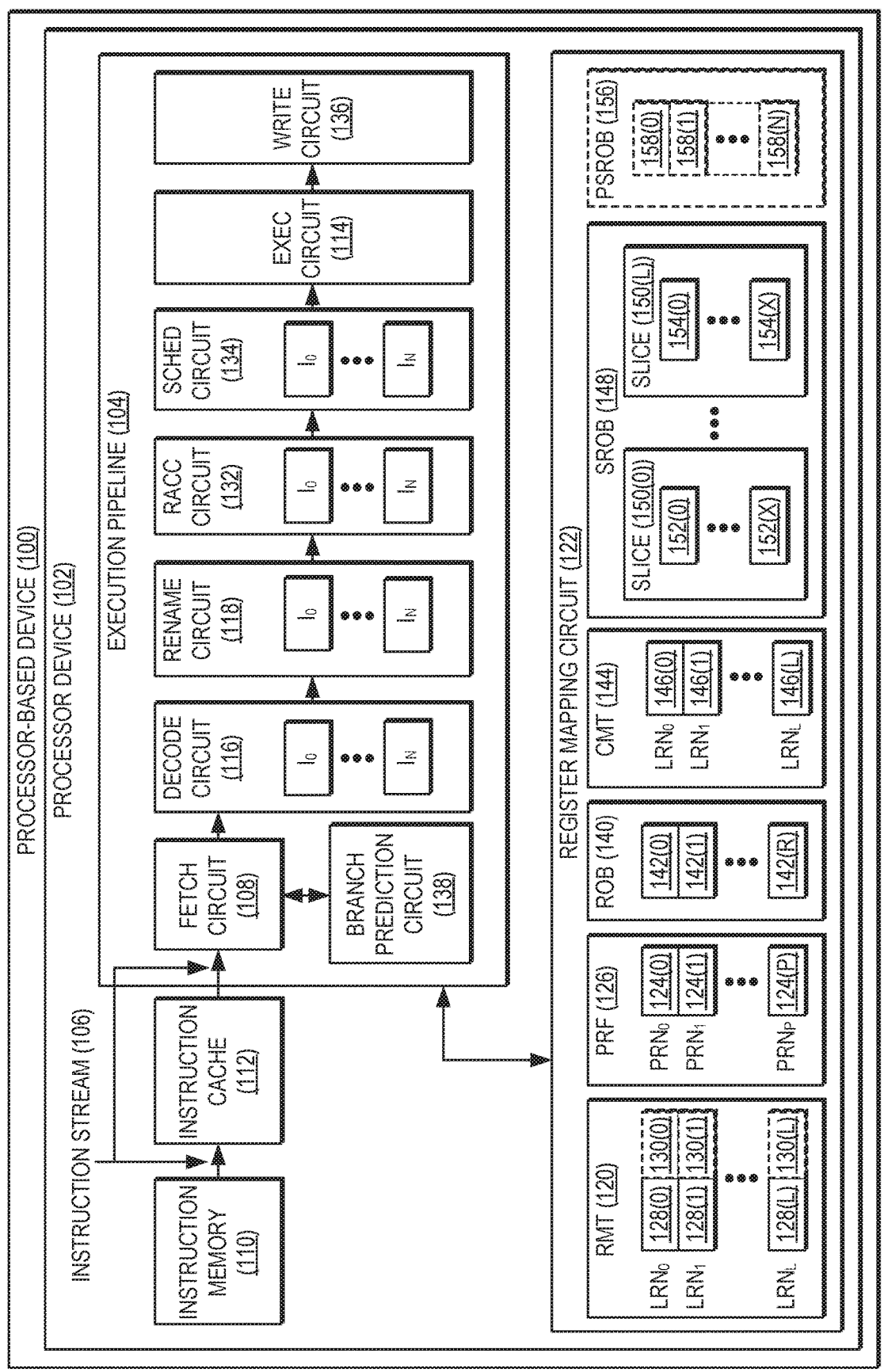
FIG. 1 is a block diagram illustrating an exemplary processor-based device configured to perform flush recovery using parallel walks of sliced reorder buffers (SROBs)
Figure 3:
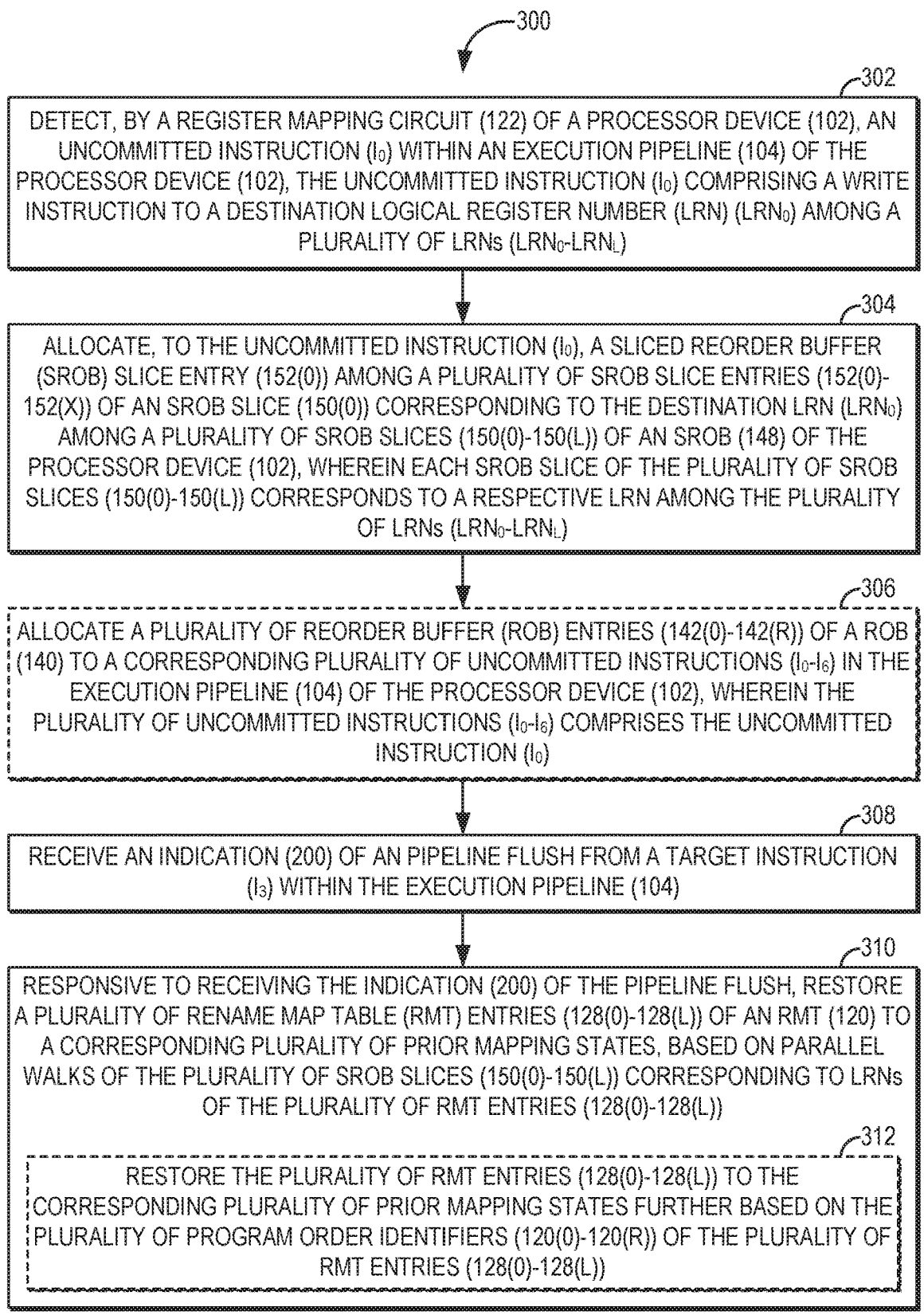
Figure 4:
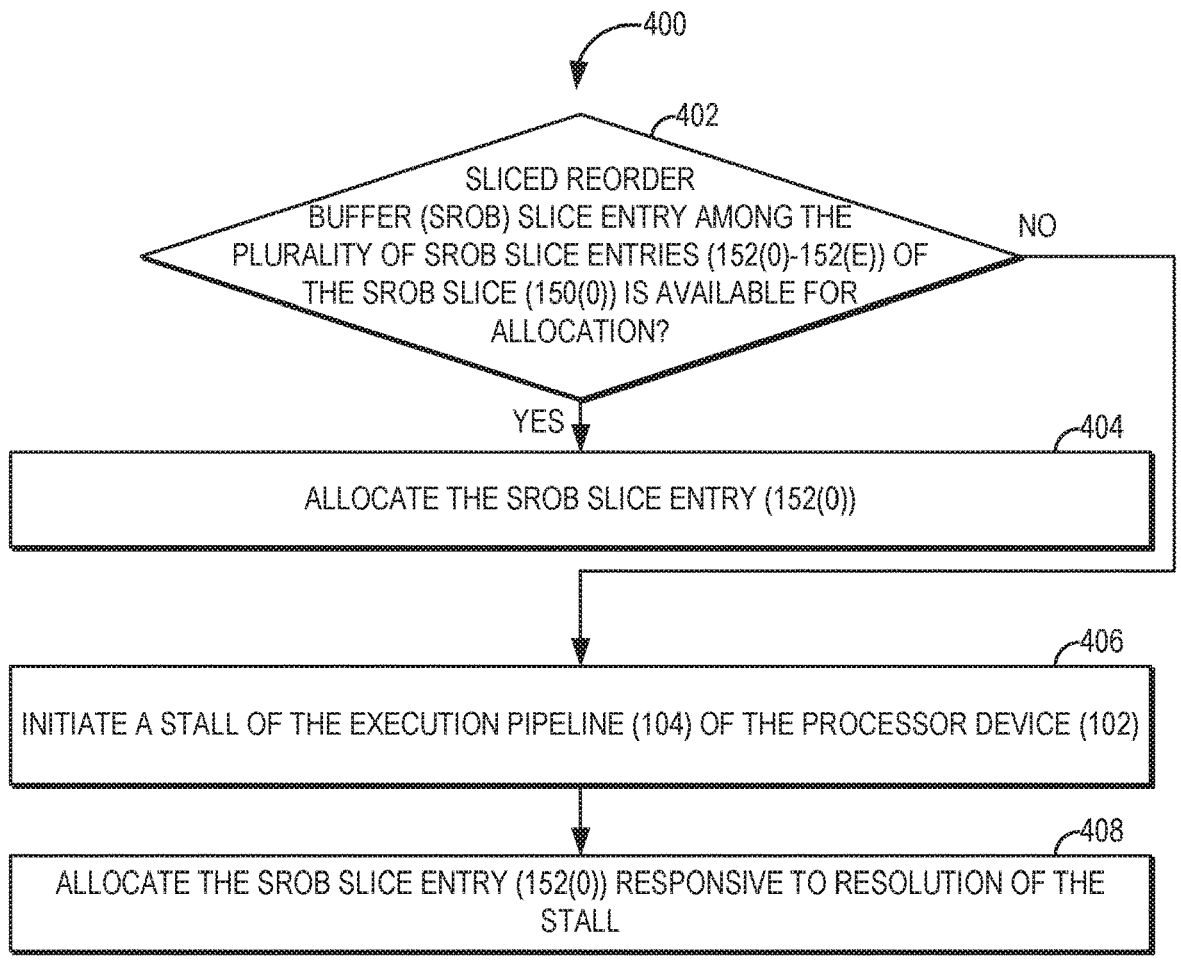
Figure 5:
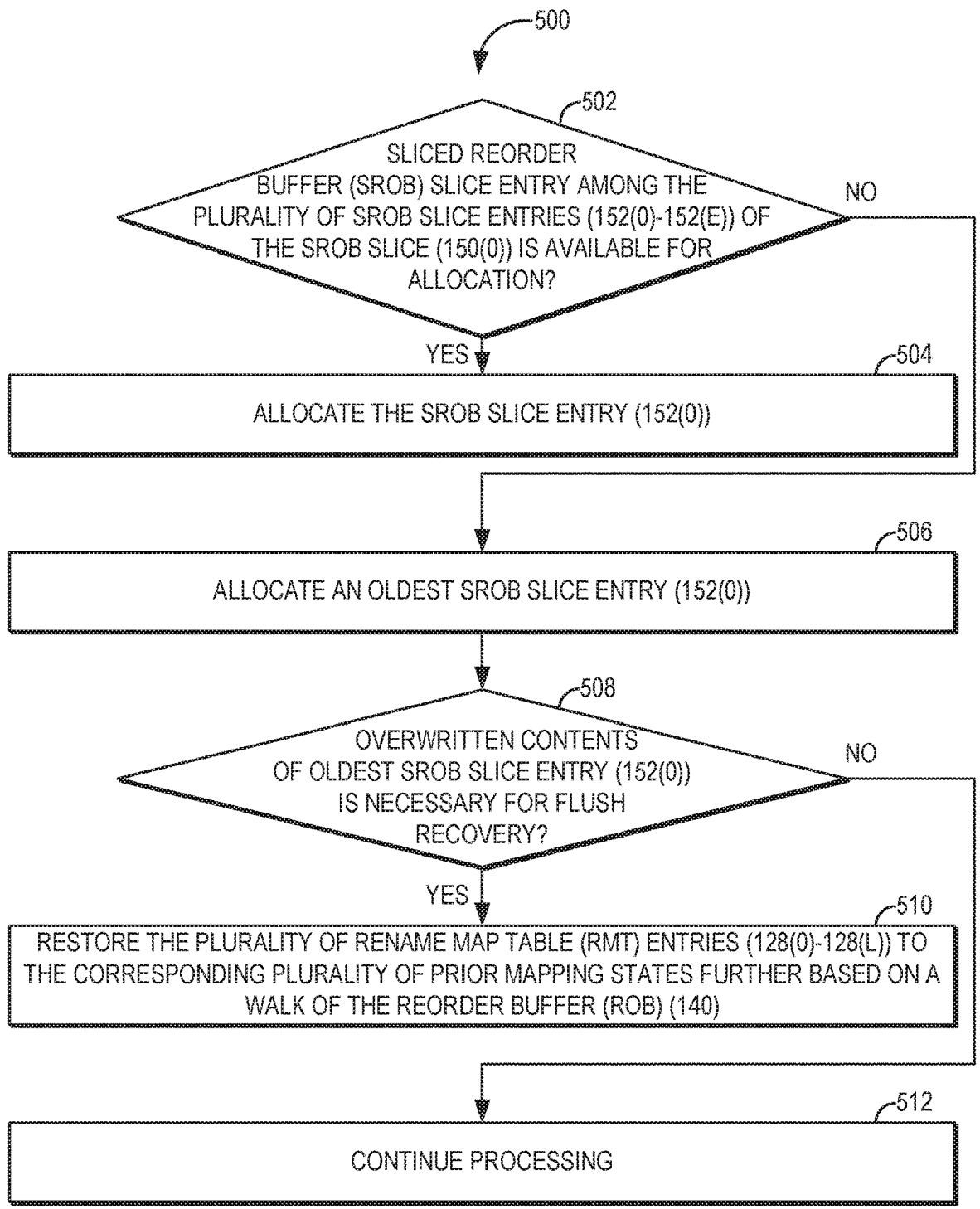
Figure 6:
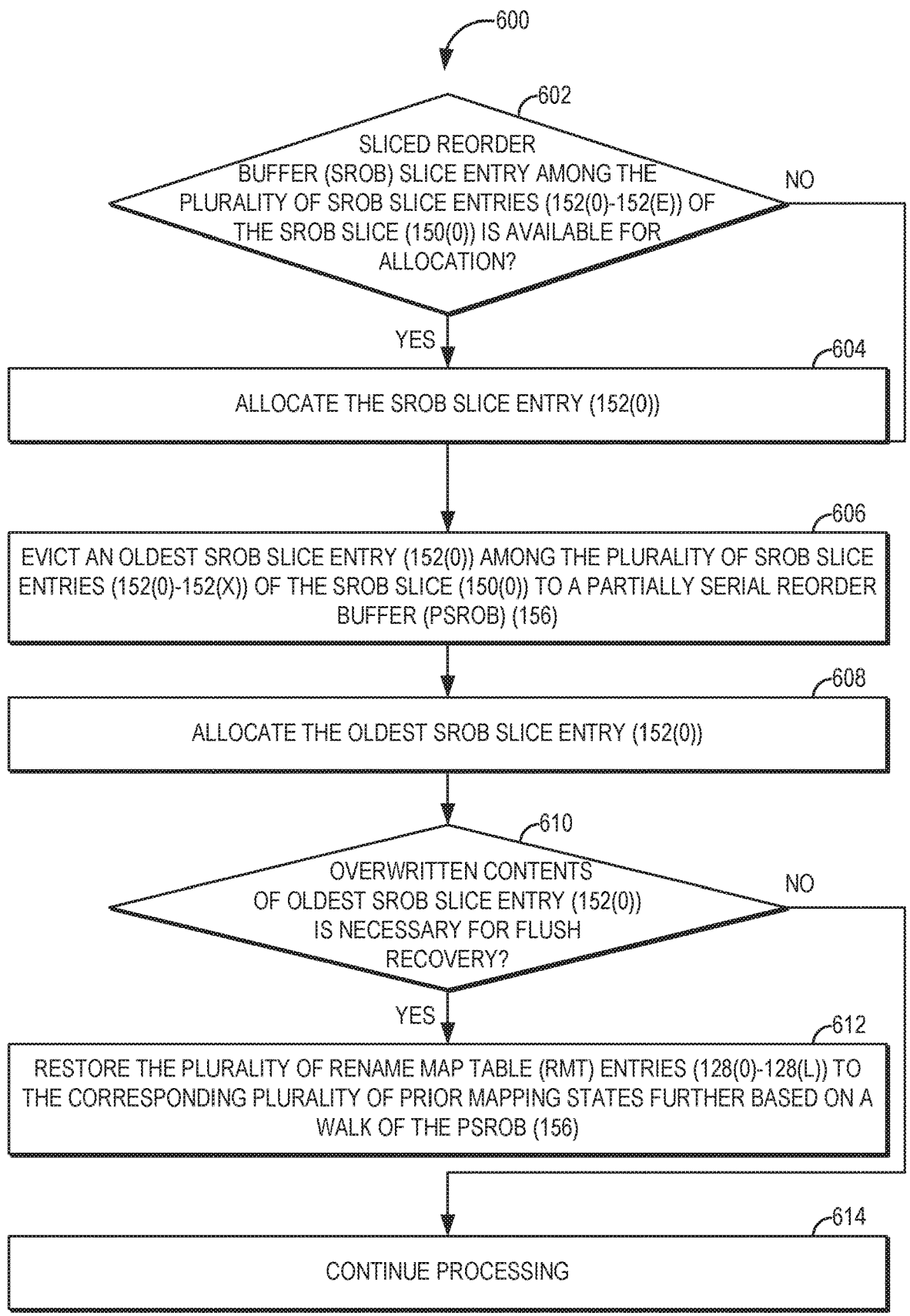
Figure 7:
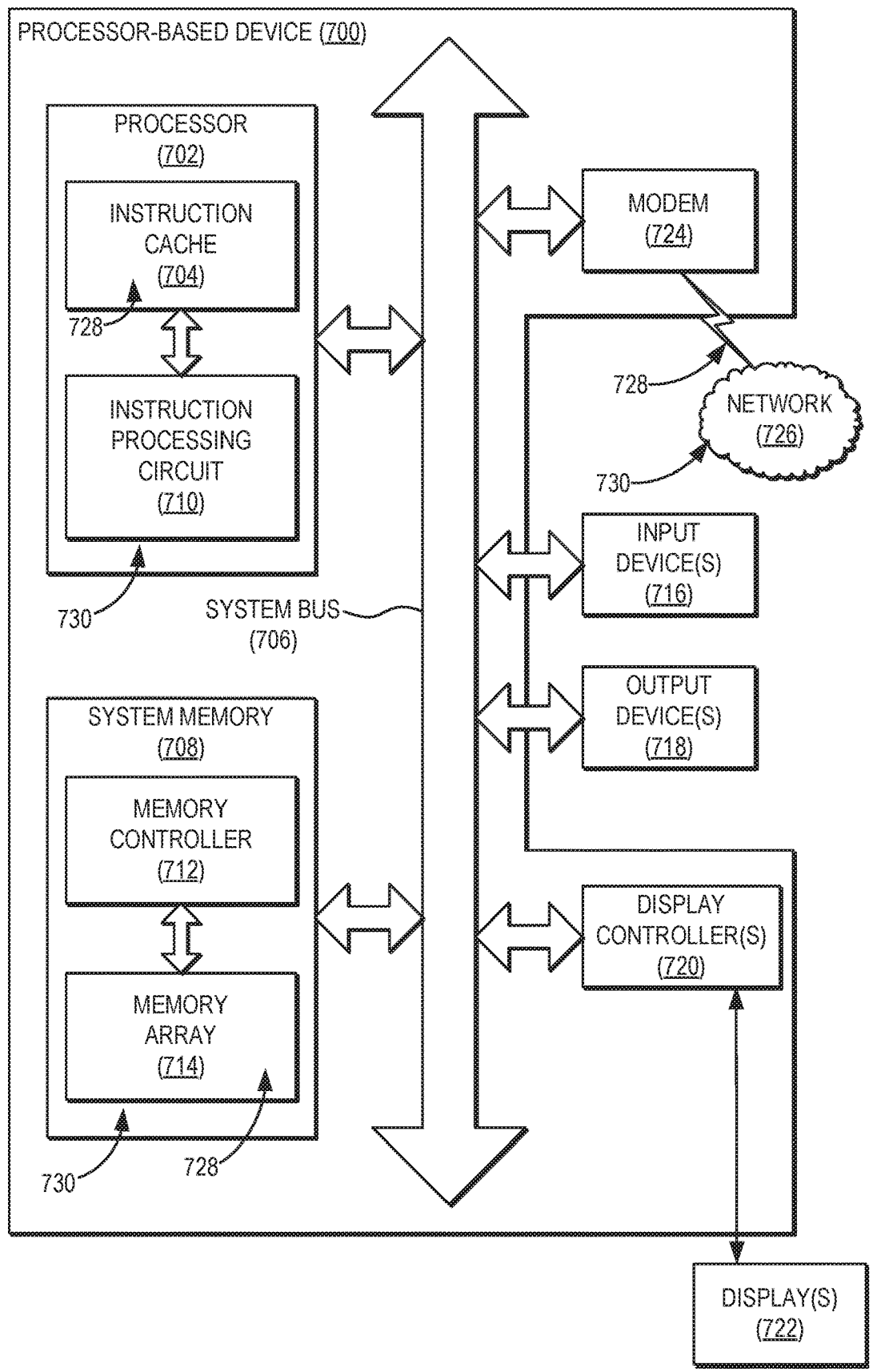

FIG. 3 provides a flowchart illustrating exemplary operations of the register mapping circuit of FIG. 1 for performing flush recovery using parallel walks of the SROB of FIG. 1, according to some embodiments;

FIG. 4 provides a flowchart illustrating exemplary operations of the register mapping circuit of FIG. 1 for allocating new SROB slice entries, according to some embodiments;

FIG. 5 provides a flowchart illustrating exemplary operations of the register mapping circuit of FIG. 1 for allocating new SROB slice entries in embodiments that overwrite older SROB slice entries, according to some embodiments;

FIG. 6 provides a flowchart illustrating exemplary operations of the register mapping circuit of FIG. 1 for allocating new SROB slice entries in embodiments that evict old entries to the partially serial reorder buffer (PSROB) of FIG. 1, according to some embodiments; and FIG. 7 is a block diagram of an exemplary processor-based device, such as the processor-based device of FIG. 1, that is configured to perform flush recovery using parallel walks of SROBs, according to some embodiments.

DETAILED DESCRIPTION

Exemplary embodiments disclosed herein include performing flush recovery using parallel walks of sliced reorder buffers (SROBs). In this regard, in one exemplary embodiment, a processor device includes a register mapping circuit that provides a rename mapping table (RMT). The RMT includes a plurality of RMT entries, each of which represents a mapping of a logical register number (LRN) to a physical register number (PRN). The register mapping circuit also provides an SROB, which includes a plurality of SROB slices. Each SROB slice corresponds to a respective LRN, and includes a plurality of SROB slice entries. Each SROB slice is similar in functionality to a conventional reorder buffer (ROB), except that the SROB slice tracks only uncommitted instructions that write to the LRN corresponding to that SROB slice, and maintains those instructions in program order only with respect to each other. In exemplary operation, the register mapping circuit, upon detecting an uncommitted instruction writing to an LRN in an execution pipeline of the processor device, allocates an SROB slice entry for the uncommitted instruction in the SROB slice corresponding to the LRN. If the register mapping circuit subsequently receives an indication of an pipeline flush from a target instruction within the execution pipeline, the register mapping circuit restores the plurality of RMT entries of the RMT to their prior mapping states based on parallel walks of the SROB slices of the SROB. Because the walks of the SROB slices are performed in parallel, and because each SROB slice is likely to contain fewer instructions than a conventional ROB, flush recovery may be accomplished more efficiently than conventional approaches.

In some embodiments, a count of the SROB slice entries within each SROB slice may be the same size as a count of ROB entries in a ROB provided by the register mapping circuit, or may be smaller than the count of the ROB entries in the ROB. In the latter case, if the register mapping circuit needs to allocate an SROB slice entry to an uncommitted instruction but no SROB slice entries are available within the appropriate SROB slice, the register mapping circuit in some embodiments may initiate a stall of the execution pipeline, causing it to stall until an SROB slice entry becomes available within the SROB slice. Some embodiments may provide that, instead of initiating a stall of the execution pipeline, the register mapping circuit may allocate the oldest SROB slice entry for the uncommitted instruction. Subsequently, if the register mapping circuit determines that overwritten contents of the oldest SROB slice entry are necessary for flush recovery, the register mapping circuit may perform a walk of the ROB. Similarly, some embodiments may provide a partially serial ROB (PSROB) to which the oldest SROB slice entry may be evicted before being allocated for the uncommitted instruction. In such embodiments, if the register mapping circuit determines that the overwritten contents of the evicted oldest SROB slice entry are necessary for flush recovery, the register mapping circuit may perform a walk of the PSROB.

In this regard, FIG. 1 illustrates an exemplary processor-based device 100 that provides a processor device 102 for processing executable instructions. The processor device 102 in some embodiments may be one of a plurality of processor devices of the processor-based device 100. The processor device 102 of FIG. 1 includes an execution pipeline 104 comprising circuitry configured to perform execution of an instruction stream 106 comprising computer-executable instructions. In the example of FIG. 1, the execution pipeline 104 includes a fetch circuit 108 that is configured to fetch the instruction stream 106 of executable instructions from an instruction memory 110. The instruction memory 110 may be provided in or as part of a system memory (not shown) of the processor-based device 100, as a non-limiting example. An instruction cache 112 may also be provided in the processor device 102 to cache instructions fetched from the instruction memory 110 to reduce latency in the fetch circuit 108. The fetch circuit 108 in the example of FIG. 1 is configured to provide instructions into one or more instruction pipelines $I_0$-$I_N$ to be pre-processed before the instructions reach an execution circuit ("EXEC CIRCUIT") 114 to be executed. The instruction pipelines $I_0$-$I_N$ are provided across different processing circuits (or "stages") of the execution pipeline 104 to concurrently process fetched instructions to increase throughput prior to execution of the fetched instructions in the execution circuit 114.

The execution pipeline 104 of FIG. 1 additionally includes a decode circuit 116 that is configured to decode instructions fetched by the fetch circuit 108 into decoded instructions to determine the instruction type and actions required, and further to determine into which instruction pipeline $I_0$-$I_N$ the decoded instructions should be placed. The decoded instructions are then placed into one or more of the instruction pipelines $I_0$-$I_N$, and are next provided to a rename circuit 118. The rename circuit 118 determines whether any register names in decoded instructions should be renamed to avoid register dependencies that could prevent parallel or out-of-order processing of instructions.

The rename circuit 118 is configured to call upon a rename map table (RMT) 120, provided by a register mapping circuit 122, to rename a logical source register operand and/or a logical destination register operand of a decoded instruction to correspond to one of a plurality of physical registers 124(0)-124(P) (each corresponding to one of a plurality of physical register numbers (PRNs) ($PRN_0$, $PRN_1$, ... $PRN_P$) in a physical register file (PRF) 126. Each of the physical registers 124(0)-124(P) in the PRF 126 is configured to store data for a source register operand and/or a destination register operand of a decoded instruction. The RMT 120 contains a plurality of RMT entries 128(0)-128(L), each of which corresponds to a respective one of a plurality of logical register numbers (LRNs) $LRN_0$-$LRN_L$. The RMT entries 128(0)-128(L) are configured to store information in the form of an address pointer to a physical register of the plurality of physical registers 124(0)-124(P) in the PRF 126. In some embodiments, the RMT entries 128(0)-128(L) are also associated with respective program order identifiers 130(0)-130(L), each of which provides an indication of the program order location of the instruction that caused the logical-register-to-physical-register mapping represented by the RMT entries 128(0)-128(L) to be created. In the event of a flush, the program order identifiers 130(0)-130(L) may be used to determine which of the RMT entries 128(0)-128(L) were updated by speculatively executed instructions older than a target instruction, and thus should be restored to a prior mapping state.

The execution pipeline 104 of FIG. 1 also includes a register access circuit ("RACC CIRCUIT") 132 that is configured to access one of the physical registers 124(0)-124(P) in the PRF 126 named by a mapping entry of the RMT entries 128(0)-128(L) corresponding to one of the logical register numbers $LRN_0$-$LRN_L$ indicated as a source register operand of a decoded instruction. The RACC circuit 132 retrieves a value in the PRF 126 produced by a previously executed instruction in the execution circuit 114. The execution pipeline 104 further provides a scheduler circuit ("SCHED CIRCUIT") 134 that is configured to store decoded instructions in reservation entries (not shown) until all source register operands for the decoded instructions are available. Additionally, a write circuit 136 is provided in the execution pipeline 104 to write back (i.e., commit) produced values from executed instructions to memory, such as the PRF 126, a data cache memory system (not shown), or a main memory (not shown). It is to be understood that, in some embodiments, elements of the execution pipeline 104 may be provided in a different configuration or order than shown in FIG. 1. For example, according to some embodiments, the register access circuit 132 may follow the scheduler circuit 134 within the execution pipeline 104 rather than preceding the scheduler circuit 134 as shown in FIG. 1.

Also provided by the execution pipeline 104 of FIG. 1 is a branch prediction circuit 138. The branch prediction circuit 138 is configured to speculatively predict the outcome of a condition of a fetched conditional flow control instruction (not shown), such as a conditional branch instruction, that controls which path in the instruction control flow path of the instruction stream 106 is fetched into the instruction pipelines $I_0$-$I_N$ for execution. With accurate speculative prediction methods, the condition of the fetched conditional flow control instruction does not have to be resolved in execution by the execution circuit 114 before the execution pipeline 104 can continue processing speculatively fetched instructions.

However, if the condition of the conditional flow control instruction is determined to have been mispredicted when the conditional flow control instruction is executed in the execution circuit 114, the speculatively fetched instructions following the mispredicted conditional flow instruction (i.e., the target instruction) in the execution pipeline 104 are flushed, because the direction of program flow is not as predicted and will not include processing of those speculatively fetched instructions. When a flush occurs (e.g., as a result of branch misprediction), the register mapping circuit 122 is configured to restore a prior mapping state (i.e., logical-register-to-physical-register mapping for each of the RMT entries 128(0)-128(L) of the RMT 120) that may have been changed by instructions that entered the instruction pipelines $I_0$-$I_N$ of the execution pipeline 104 after the target instruction.

To facilitate restoring the prior mapping state of the RMT 120, the register mapping circuit 122 provides a reorder buffer (ROB) 140 containing a plurality of ROB entries 142(0)-142(R) that are allocated to "in-flight" instructions that are being processed by the execution pipeline 104 but have not been committed (i.e., "uncommitted instructions"). The ROB entries 142(0)-142(R) are allocated sequentially in program order to uncommitted instructions. Information about changes to the mapping of the logical register numbers $LRN_0$-$LRN_L$ by the RMT 120 (i.e., "register mapping information") by an instruction is stored in association with each ROB entry 142(0)-142(R) allocated to the instruction. The register mapping information stored by the RMT 120 for uncommitted instructions may be used according to conventional techniques to achieve recovery in response to a flush. The register mapping circuit 122 of FIG. 1 also includes a committed map table (CMT) 144 providing a plurality of mapping entries 146(0)-146(L) in which the logical-register-to-physical-register mapping resulting from committed instructions are stored. The CMT 144 is only updated when an instruction is committed, and consequently is not changed in response to a flush.

As noted above, conventional techniques for restoring the RMT 120 to a prior mapping state following a flush, including lazy recovery and immediate recovery techniques, may be inefficient in circumstances involving a large number of older uncommitted instructions at the time of the flush. Accordingly, exemplary embodiments disclosed herein provide a sliced ROB (SROB) 148. The SROB 148 is subdivided into a plurality of SROB slices ("SLICE") 150(0)-150(L), each comprising a plurality of SROB slice entries such as SROB slice entries 152(0)-152(X), 154(0)-154(X). Each of the SROB slices 150(0)-150(L) functions in a manner similar to the ROB 140, except that each SROB slice 150(0)-150(L) corresponds to a respective one of the plurality of LRNs $LRN_0$-$LRN_L$, and tracks only uncommitted instructions that write to a destination LRN corresponding to that SROB slice 150(0)-150(L). For example, the SROB slice 150(0) in the example of FIG. 1 corresponds to $LRN_0$, and thus tracks uncommitted instructions that comprise a write instruction to the destination LRN $LRN_0$. The SROB slice entries 152(0)-152(X), 154(0)-154(X) store the same data for their respective uncommitted instructions as the ROB entries 142(0)-142(R), and are allocated sequentially in program order with respect to other SROB slice entries within the same SROB slice 150(0)-150(L).

In exemplary operation, the register mapping circuit 122, upon detecting an uncommitted instruction writing to a destination LRN in the execution pipeline 104, allocates one of the SROB slice entries 152(0)-152(X), 154(0)-154(X) for the uncommitted instruction in the SROB slice 150(0)-150(L) corresponding to the destination LRN. If the register mapping circuit 122 subsequently receives an indication of an pipeline flush from a target instruction within the execution pipeline 104, the register mapping circuit 122 restores the plurality of RMT entries 128(0)-128(L) of the RMT 120 to their prior mapping states based on parallel walks of the SROB slices 150(0)-150(L) of the SROB 148. For example, the register mapping circuit 122 may perform a walk of each of the SROB slices 150(0)-150(L) in parallel by accessing SROB slice entries 152(0)-152(X), 154(0)-154(X) corresponding to uncommitted instructions younger than a target instruction that caused a flush, and using the data stored in each of the SROB slice entries 152(0)-152(X), 154(0)-154(X) to undo the changes made by the uncommitted instructions to the RMT entries 128(0)-128(L) corresponding to the LRN for each SROB slice 150(0)-150(L). Because the walks of the SROB slices 150(0)-150(L) are performed in parallel, and because each of the SROB slices 150(0)-150(L) is likely to contain fewer instructions than the ROB 140, flush recovery may be accomplished more efficiently than conventional approaches.

In some embodiments, the count of each of the SROB slice entries 152(0)-152(X), 154(0)-154(X) may be the same as the count of the ROB entries 142(0)-142(R) (i.e., X=R). Such embodiments may offer improved performance, because the SROB slices 150(0)-150(L) are sized large enough to handle situations in which every uncommitted write instruction in the ROB 140 targets the same destination LRN among the plurality of LRNs $LRN_0$-$LRN_L$. However, the improved performance comes at the cost of increased processor resources needed to implement the SROB 148.

Other embodiments may provide that the count of each of the SROB slice entries 152(0)-152(X), 154(0)-154(X) may be less than the count of the ROB entries 142(0)-142(R) (i.e., X<R). In such embodiments, the register mapping circuit 122 provides special handling for circumstances in which none of the SROB slice entries 152(0)-152(X), 154(0)-154(X) are available for allocation to a new uncommitted instruction. According to some embodiments, if none of the SROB slice entries 152(0)-152(X), 154(0)-154(X) are available for allocation, the register mapping circuit 122 may initiate a stall of the execution pipeline 104 until one of the SROB slice entries 152(0)-152(X), 154(0)-154(X) within the appropriate SROB slice 150(0)-150(L) becomes available for allocation. Once the stall is resolved (i.e., when one of the SROB slice entries 152(0)-152(X), 154(0)-154(X) becomes available), the register mapping circuit 122 then allocates one of the SROB slice entries 152(0)-152(X), 154(0)-154(X) within the appropriate SROB slice 150(0)-150(L).

In some embodiments, in response to determining that none of the SROB slice entries 152(0)-152(X), 154(0)-154(X) are available for allocation, the register mapping circuit 122 may overwrite an oldest SROB slice entry 152(0)-152(X), 154(0)-154(X) for the new uncommitted instruction. If the register mapping circuit 122 later determines that the overwritten contents of the oldest SROB slice entry 152(0)-152(X), 154(0)-154(X) are necessary for flush recovery, the register mapping circuit 122 may perform a walk of the ROB 140 in conventional fashion to restore the RMT entries 128(0)-128(L) of the RMT 120 to a prior mapping state. Because performing a walk of the ROB 140 may incur the same performance penalties as conventional mechanisms for flush recovery, the register mapping circuit 122 in some embodiments may provide a partially serial ROB (PSROB) 156 comprising a plurality of PSROB entries 158(0)-158(P). The PSROB 156 in such embodiments functions in a manner similar to the ROB 140, but allocates PSROB entries 158(0)-158(P) only to store SROB slice entries 152(0)-152(X), 154(0)-154(X) that are evicted from the SROB slices 150(0)-150(L) if there are no free SROB slice entries 152(0)-152(X), 154(0)-154(X) to allocate for the new uncommitted instruction. If the register mapping circuit 122 later determines that the overwritten contents of the oldest SROB slice entry 152(0)-152(X), 154(0)-154(X) are necessary for flush recovery, the register mapping circuit 122 may perform a walk of the PSROB 156 to restore the RMT entries 128(0)-128(L) of the RMT 120 to a prior mapping state.

Figure 2:
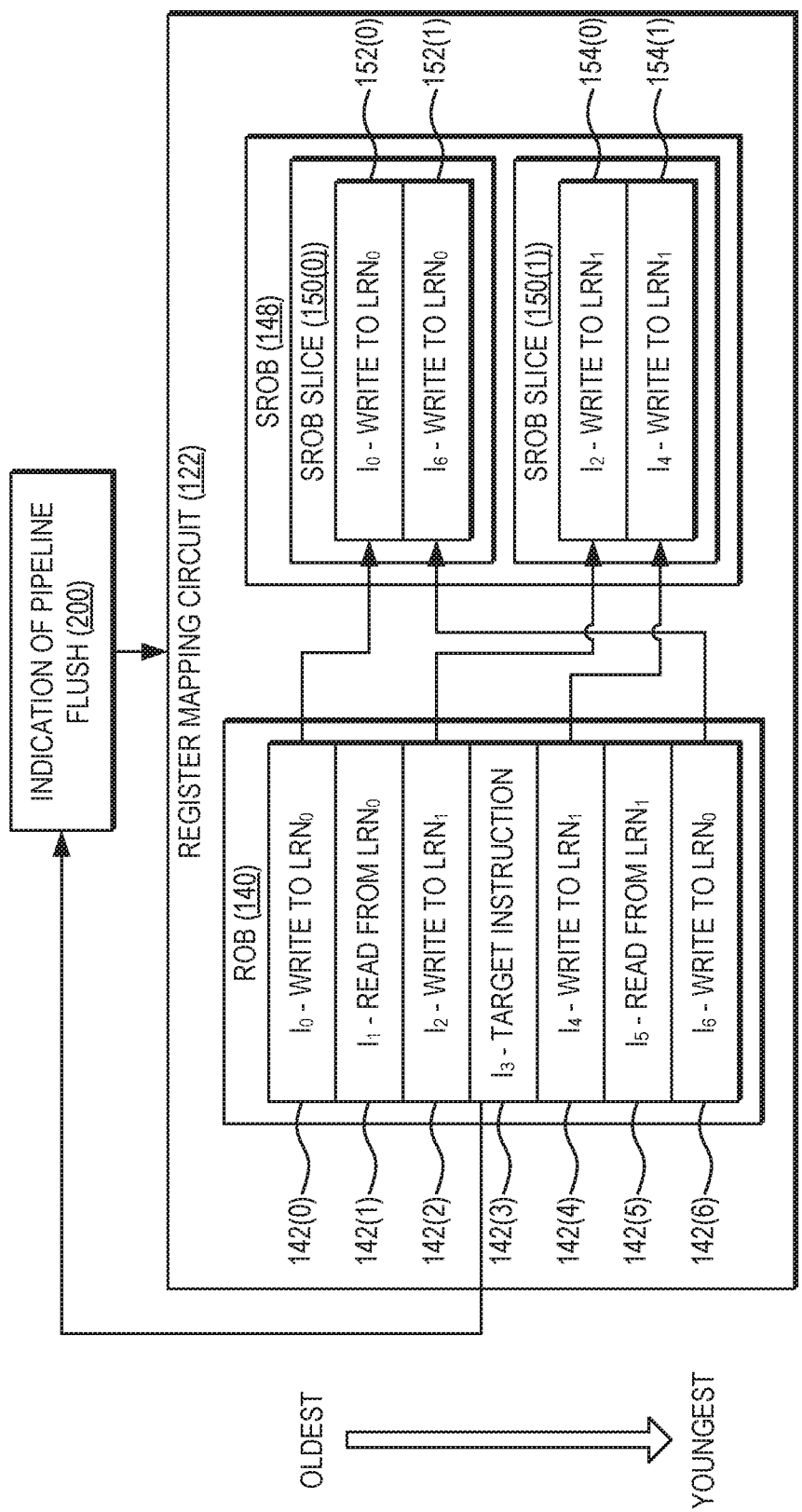
FIG. 2 is a diagram illustrating exemplary contents of the reorder buffer and the SROB of FIG. 1, according to some embodiments.

To illustrate exemplary contents of the ROB 140 and the SROB 148 of FIG. 1 according to some embodiments, FIG. 2 is provided. In FIG. 2, the register mapping circuit 122, the ROB 140, and the SROB 148 of FIG. 1 are shown. The ROB 140 includes the ROB entries 142(0)-142(6), each of which corresponds to the uncommitted instructions $I_0$-$I_6$. The instructions $I_0$-$I_6$ include instructions that write to destination LRNs $LRN_0$ and $LRN_1$, which in the example of FIG. 2 correspond to the SROB slices 150(0) and 150(1), respectively, of FIG. 1. In exemplary operation, the register mapping circuit 122 detects the uncommitted instructions $I_0$-$I_6$ (e.g., in the execution pipeline 104 of FIG. 1), and allocates the ROB entries 142(0)-142(6) for the uncommitted instructions $I_0$-$I_6$ respectively. For the instructions $I_0$, $I_2$, $I_4$, and $I_6$, the register mapping circuit 122 also allocates SROB slice entries 152(0), 154(0), 152(1), and 154(1), respectively.

During execution of the instructions $I_0$-$I_6$, a target instruction $I_3$ fails to execute as expected (e.g., because the target instruction $I_3$ is determined to be a mispredicted branch instruction, or because the target instruction $I_3$ is a load or store instruction for which a calculated address of a memory location may be invalid or cannot be accessed). An pipeline flush is triggered, causing the register mapping circuit 122 to receive an indication 200 of the pipeline flush from the target instruction $I_3$. The pipeline flush results in all instructions younger than the target instruction $I_3$ (i.e., instructions $I_4$-$I_6$) being flushed from the execution pipeline 104, and requires that the RMT 120 of FIG. 1 be restored to a prior mapping state corresponding to the state the RMT 120 was in when execution of the target instruction $I_3$ was attempted.

Instead of walking the ROB 140 in conventional fashion to restore the RMT 120, the register mapping circuit 122 performs parallel walks of the SROB slices 150(0) and 150(1) to identify SROB slice entries that correspond to any of the flushed instructions $I_4$-$I_6$ and to undo any mapping changes made to the RMT 120 by the flushed instructions $I_4$-$I_6$. In the example of FIG. 2, the parallel walks of the SROB slices 150(0) and 150(1) result in the register mapping circuit 122 identifying SROB slice entries 152(1) and 154(1) as corresponding to instructions $I_4$ and $I_6$, the uncommitted instructions that are younger than the target instruction $I_3$ and that modified mappings in the RMT 120. The register mapping circuit 122 then uses the data in the SROB slice entries 152(1) and 154(1) to restore RMT entries corresponding to $LRN_0$ and $LRN_1$ in the RMT 120 (e.g., the RMT entries 128(0) and 128(1) in FIG. 1) to a prior mapping state.

In some examples, the register mapping circuit 122 may employ the program order identifiers 130(0)-130(L) of the RMT entries 128(0)-128(L) to determine which of the LRNs $LRN_0$-$LRN_L$ need to be restored to a prior mapping state. For example, the register mapping circuit 122 may determine, based on the program order identifiers 130(0)-130(L), that a mapping state of one of the RMT entries 128(0)-128(L) was modified by an uncommitted instruction older than the target instruction $I_3$. The register mapping circuit 122 may then optimize the restoration of the RMT 120 by not performing a walk of the SROB slice 150(0)-150(L) that corresponds to the LRN of that particular RMT entry.

FIG. 3 provides a flowchart 300 illustrating exemplary operations of the register mapping circuit 122 of FIG. 1 for performing flush recovery using parallel walks of the SROB 148 of FIG. 1, according to some embodiments. Elements of FIGS. 1 and 2 are referenced in describing FIG. 3 for the sake of clarity. In FIG. 3, operations begin with the register mapping circuit 122 of the processor device 102 detecting an uncommitted instruction, such as the instruction $I_0$ of FIG. 2, within the execution pipeline 104 of the processor device 102, the uncommitted instruction $I_0$ comprising a write instruction to a destination LRN $LRN_0$ among a plurality of LRNs $LRN_0$-$LRN_L$ (block 302). The register mapping circuit 122 allocates, to the uncommitted instruction $I_0$, an SROB slice entry 152(0) among the plurality of SROB slice entries 152(0)-152(X) of an SROB slice 150(0) corresponding to the destination LRN $LRN_0$ among the plurality of SROB slices 150(0)-150(L) of the SROB 148 of the processor device 102, wherein each SROB slice of the plurality of SROB slices 150(0)-150(L) corresponds to a respective LRN among the plurality of LRNs $LRN_0$-$LRN_L$ (block 304). In some embodiments, the register mapping circuit 122 also allocates the plurality of ROB entries 142(0)-142(R) of the ROB 140 to a corresponding plurality of uncommitted instructions (such as the instructions $I_0$-$I_6$ of FIG. 2) in the execution pipeline 104 of the processor device 102, wherein the plurality of uncommitted instructions $I_0$-$I_6$ comprises the uncommitted instruction $I_0$ (block 306).

The register mapping circuit 122 then receives the indication 200 of an pipeline flush from the target instruction $I_3$ within the execution pipeline 104 (block 308). In response, the register mapping circuit 122 restores the plurality of RMT entries 128(0)-128(L) of the RMT 120 to a corresponding plurality of prior mapping states, based on parallel walks of the plurality of SROB slices 150(0)-150(L) corresponding to LRNs of the plurality of RMT entries 128(0)-128(L) (block 310). In some embodiments, the register mapping circuit 122 may restore the plurality of RMT entries 128(0)-128(L) to the corresponding plurality of prior mapping states further based on the plurality of program order identifiers 130(0)-130(L) of the plurality of RMT entries 128(0)-128(L) (block 312).

To illustrate exemplary operations of the register mapping circuit 122 of FIG. 1 for allocating new SROB slice entries 152(0)-152(X), 154(0)-154(X) according to some embodiments, FIG. 4 provides a flowchart 400. For the sake of clarity, elements of FIG. 1 are referenced in describing FIG. 4. In FIG. 4, it is assumed that the count of the SROB slice entries 152(0)-152(X), 154(0)-154(X) of the SROB 148 of FIG. 1 is less than the count of the ROB entries 142(0)-142(R) of the ROB 140 of FIG. 1. In FIG. 4, operations begin with the register mapping circuit 122 determining whether an SROB slice entry among the plurality of SROB slice entries 152(0)-152(X) of an SROB slice (e.g., the SROB slice 150(0)) is available for allocation (block 402). If so, the register mapping circuit 122 allocates an SROB slice entry, such as the SROB slice entry 152(0) (block 404).

However, if the register mapping circuit 122 determines at decision block 402 that no SROB slice entries are available for allocation, the register mapping circuit 122 initiates a stall of the execution pipeline 104 of the processor device 102 (block 406). Once the stall has been resolved (i.e., by one of the SROB slice entries 152(0)-152(X) becoming available for allocation), the register mapping circuit 122 allocates an SROB slice entry, such as the SROB slice entry 152(0) (block 408).

FIG. 5 provides a flowchart 500 illustrating exemplary operations of the register mapping circuit 122 of FIG. 1 for allocating new SROB slice entries 152(0)-152(X), 154(0)-154(X) in embodiments that evict old entries to the ROB 140 of FIG. 1. Elements of FIG. 1 are referenced in describing FIG. 5 for the sake of clarity. It is assumed in FIG. 5 that the count of the SROB slice entries 152(0)-152(X), 154(0)-154(X) of the SROB 148 of FIG. 1 is less than the count of the ROB entries 142(0)-142(R) of the ROB 140 of FIG. 1. Operations in FIG. 5 begin with the register mapping circuit 122 determining whether an SROB slice entry among the plurality of SROB slice entries 152(0)-152(X) of an SROB slice (e.g., the SROB slice 150(0)) is available for allocation (block 502). If so, the register mapping circuit 122 allocates an SROB slice entry, such as the SROB slice entry 152(0) (block 504).

However, if the register mapping circuit 122 determines at decision block 502 that no SROB slice entries are available for allocation, the register mapping circuit 122 allocates an oldest SROB slice entry, such as the SROB slice entry 152(0) (block 506). Subsequently, the register mapping circuit 122, in the course of performing flush recovery, determines whether the overwritten contents of the oldest SROB slice entry 152(0) are necessary for flush recovery (block 508). For example, the register mapping circuit 122 may determine that the oldest of the remaining SROB slice entries 152(0)-152(X) of the SROB slice 150(0) corresponds to an instruction that follows the target instruction in program order. If the overwritten contents of the oldest SROB slice entry 152(0) are determined to be necessary for flush recovery, the register mapping circuit restores the plurality of RMT entries 128(0)-128(L) to the corresponding plurality of prior mapping states further based on a walk of the ROB 140 (block 510). Otherwise, processing continues as described in embodiments disclosed herein (block 512).

To illustrate exemplary operations of the register mapping circuit 122 of FIG. 1 for allocating new SROB slice entries 152(0)-152(X), 154(0)-154(X) in embodiments that evict old entries to the PSROB 156 of FIG. 1, FIG. 6 provides a flowchart 600. For the sake of clarity, elements of FIG. 1 are referenced in describing FIG. 6. It is assumed in FIG. 6 that the count of the SROB slice entries 152(0)-152(X), 154(0)-154(X) of the SROB 148 of FIG. 1 is less than the count of the ROB entries 142(0)-142(R) of the ROB 140 of FIG. 1. In FIG. 6, operations begin with the register mapping circuit 122 determining whether an SROB slice entry among the plurality of SROB slice entries 152(0)-152(X) of an SROB slice (e.g., the SROB slice 150(0)) is available for allocation (block 602). If so, the register mapping circuit 122 allocates an SROB slice entry, such as the SROB slice entry 152(0) (block 604).

However, if the register mapping circuit 122 determines at decision block 402 that no SROB slice entries are available for allocation, the register mapping circuit 122 evicts an oldest SROB slice entry, such as the SROB slice entry 152(0), of the plurality of SROB slice entries 152(0)-152(X) of the SROB slice 150(0) to the PSROB 156 (block 606). The register mapping circuit 122 then allocates the oldest SROB slice entry 152(0) (block 608). The register mapping circuit 122 later determines, in the course of performing flush recovery, whether the overwritten contents of the evicted oldest SROB slice entry 152(0) are necessary for flush recovery (block 610). If so, the register mapping circuit restores the plurality of RMT entries 128(0)-128(L) to the corresponding plurality of prior mapping states further based on a walk of the PSROB 156 (block 612). Otherwise, processing continues as described in embodiments disclosed herein (block 614).

FIG. 7 is a block diagram of an exemplary processor-based device 700, such as the processor-based device 100 of FIG. 1, that provides exception stack management using stack panic fault exceptions. The processor-based device 700 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server or a user's computer. In this example, the processor-based device 700 includes a processor 702. The processor 702 represents one or more general-purpose processing circuits, such as a microprocessor, central processing unit, or the like, and may correspond to the processor device 102 of FIG. 1. The processor 702 is configured to execute processing logic in instructions for performing the operations and steps discussed herein. In this example, the processor 702 includes an instruction cache 704 for temporary, fast access memory storage of instructions and an instruction processing circuit 710. Fetched or prefetched instructions from a memory, such as from a system memory 708 over a system bus 706, are stored in the instruction cache 704. The instruction processing circuit 710 is configured to process instructions fetched into the instruction cache 704 and process the instructions for execution.

The processor 702 and the system memory 708 are coupled to the system bus 706 and can intercouple peripheral devices included in the processor-based device 700. As is well known, the processor 702 communicates with these other devices by exchanging address, control, and data information over the system bus 706. For example, the processor 702 can communicate bus transaction requests to a memory controller 712 in the system memory 708 as an example of a peripheral device. Although not illustrated in FIG. 7, multiple system buses 706 could be provided, wherein each system bus constitutes a different fabric. In this example, the memory controller 712 is configured to provide memory access requests to a memory array 714 in the system memory 708. The memory array 714 is comprised of an array of storage bit cells for storing data. The system memory 708 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 706. As illustrated in FIG. 7, these devices can include the system memory 708, one or more input device(s) 716, one or more output device(s) 718, a modem 724, and one or more display controller(s) 720, as examples. The input device(s) 716 can include any type of input device, including, but not limited to, input keys, switches, voice processors, etc. The output device(s) 718 can include any type of output device, including, but not limited to, audio, video, other visual indicators, etc. The modem 724 can be any device configured to allow exchange of data to and from a network 726. The network 726 can be any type of network, including, but not limited to, a wired or wireless network, a private or public network, a local area network (LAN), a wireless local area network (WLAN), a wide area network (WAN), a BLUETOOTH™ network, and the Internet. The modem 724 can be configured to support any type of communications protocol desired. The processor 702 may also be configured to access the display controller(s) 720 over the system bus 706 to control information sent to one or more display(s) 722. The display(s) 722 can include any type of display, including, but not limited to, a cathode ray tube (CRT), a liquid crystal display (LCD), a plasma display, etc.

The processor-based device 700 in FIG. 7 may include a set of instructions 728 that may be encoded with the reach-based explicit consumer naming model to be executed by the processor 702 for any application desired according to the instructions. The instructions 728 may be stored in the system memory 708, the processor 702, and/or the instruction cache 704 as examples of a non-transitory computer-readable medium 730. The instructions 728 may also reside, completely or at least partially, within the system memory 708 and/or within the processor 702 during their execution. The instructions 728 may further be transmitted or received over the network 726 via the modem 724, such that the network 726 includes the computer-readable medium 730.

While the computer-readable medium 730 is shown in an exemplary embodiment to be a single medium, the term "computer-readable medium" should be taken to include a single medium or multiple media (e.g., a centralized or distributed database, and/or associated caches and servers) that store the one or more sets of instructions 728. The term "computer-readable medium" shall also be taken to include any medium that is capable of storing, encoding, or carrying a set of instructions for execution by a processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software process.

The embodiments disclosed herein may be provided as a computer program product, or software process, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory (RAM), a magnetic disk storage medium, an optical storage medium, flash memory devices, etc.), and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A register mapping circuit in a processor device, the register mapping circuit comprising:
   a rename map table (RMT) comprising a plurality of RMT entries each representing a mapping of a logical register number (LRN) among a plurality of LRNs to a physical register number (PRN) among a plurality of PRNs; and
   a reorder buffer (ROB) comprising a plurality of ROB entries;
   a sliced reorder buffer (SROB) subdivided into a plurality of SROB slices each comprising a plurality of SROB slice entries, wherein each SROB slice is configured to track only uncommitted instructions that write to a respective LRN among the plurality of LRNs;
   the register mapping circuit configured to:
      detect, within an execution pipeline of the processor device, an uncommitted instruction comprising a write instruction to a destination LRN among the plurality of LRNs;
      allocate, to the uncommitted instruction, an SROB slice entry among the plurality of SROB slice entries of an SROB slice corresponding to the destination LRN among the plurality of SROB slices of the SROB;
      receive an indication of a pipeline flush from a target instruction within the execution pipeline; and
      responsive to receiving the indication of the pipeline flush, restore the plurality of RMT entries to a corresponding plurality of prior mapping states, based on sequential accesses, performed in parallel, of the plurality of SROB slices corresponding to LRNs of the plurality of RMT entries.

2. The register mapping circuit of claim 1, wherein:
   the plurality of RMT entries comprises a respective plurality of program order identifiers; and
   the register mapping circuit is configured to restore the plurality of RMT entries to the corresponding plurality of prior mapping states further based on the plurality of program order identifiers of the plurality of RMT entries.

3. The register mapping circuit of claim 1, wherein:
   the register mapping circuit is further configured to allocate the plurality of ROB entries to a corresponding plurality of uncommitted instructions in the execution pipeline of the processor device, wherein the plurality of uncommitted instructions comprises the uncommitted instruction.

4. The register mapping circuit of claim 3, wherein a count of the plurality of SROB slice entries of each SROB slice among the plurality of SROB slices of the SROB equals a count of the plurality of ROB entries.

5. The register mapping circuit of claim 3, wherein:
   a count of the plurality of SROB slice entries of each SROB slice among the plurality of SROB slices of the SROB is less than a count of the plurality of ROB entries; and
   the register mapping circuit is further configured to allocate the SROB slice entry by being configured to:
      determine that no SROB slice entry among the plurality of SROB slice entries of the SROB slice is available for allocation; and
      responsive to determining that no SROB slice entry among the plurality of SROB slice entries of the SROB slice is available for allocation:
         initiate a stall of the execution pipeline of the processor device; and
         allocate the SROB slice entry responsive to resolution of the stall.

6. The register mapping circuit of claim 3, wherein:
   a count of the plurality of SROB slice entries of each SROB slice of the plurality of SROB slices of the SROB is less than a count of the plurality of ROB entries; and
   the register mapping circuit is further configured to allocate the SROB slice entry by being configured to:
      determine that no SROB slice entry among the plurality of SROB slice entries of the SROB slice is available for allocation; and
      responsive to determining that no SROB slice entry among the plurality of SROB slice entries of the SROB slice is available for allocation, allocate an oldest SROB slice entry.

7. The register mapping circuit of claim 6, wherein the register mapping circuit is configured to restore the plurality of RMT entries to the corresponding plurality of prior mapping states by being configured to:
- determine, while performing a walk of the SROB slice, that overwritten contents of the oldest SROB slice entry are necessary for flush recovery; and
- responsive to determining that the overwritten contents of the oldest SROB slice entry are necessary for flush recovery, restore the plurality of RMT entries to the corresponding plurality of prior mapping states further based on a walk of the ROB.

8. The register mapping circuit of claim 3, wherein:
the register mapping circuit further comprises a partially serial ROB (PSROB);
a count of the plurality of SROB slice entries of each SROB slice of the plurality of SROB slices of the SROB is less than a count of the plurality of ROB entries; and
the register mapping circuit is further configured to allocate the SROB slice entry by being configured to:
- determine that no SROB slice entry among the plurality of SROB slice entries of the SROB slice is available for allocation; and
- responsive to determining that no SROB slice entry among the plurality of SROB slice entries of the SROB slice is available for allocation:
  - evict an oldest SROB slice entry of the plurality of SROB slice entries of the SROB slice to the PSROB; and
  - allocate the oldest SROB slice entry.

9. The register mapping circuit of claim 8, wherein the register mapping circuit is configured to restore the plurality of RMT entries to the corresponding plurality of prior mapping states by being configured to:
- determine, while performing a walk of the SROB slice, that overwritten contents of the evicted oldest SROB slice entry are necessary for flush recovery; and
- responsive to determining that the overwritten contents of the evicted oldest SROB slice entry are necessary for flush recovery, restore the plurality of RMT entries to the corresponding plurality of prior mapping states further based on a walk of the PSROB.

10. A method for performing flush recovery using parallel walks of sliced reorder buffers (SROBs), the method comprising:
- detecting, by a register mapping circuit of a processor device, an uncommitted instruction within an execution pipeline of the processor device, the uncommitted instruction comprising a write instruction to a destination logical register number (LRN) among a plurality of LRNs, wherein the register mapping circuit comprises a reorder buffer (ROB);
- allocating, to the uncommitted instruction, an SROB slice entry among a plurality of SROB slice entries of an SROB slice corresponding to the destination LRN among a plurality of SROB slices of an SROB of the processor device, wherein each SROB slice of the plurality of SROB slices is configured to track only uncommitted instructions that write to a respective LRN among the plurality of LRNs;
- receiving an indication of a pipeline flush from a target instruction within the execution pipeline; and
- responsive to receiving the indication of the pipeline flush, restoring a plurality of rename map table (RMT) entries of an RMT to a corresponding plurality of prior mapping states, based on sequential accesses, performed in parallel, of the plurality of SROB slices corresponding to LRNs of the plurality of RMT entries.

11. The method of claim 10, wherein:
the plurality of RMT entries comprises a respective plurality of program order identifiers; and
restoring the plurality of RMT entries to the corresponding plurality of prior mapping states is further based on the plurality of program order identifiers of the plurality of RMT entries.

12. The method of claim 10, further comprising allocating a plurality of reorder buffer (ROB) entries of the ROB to a corresponding plurality of uncommitted instructions in the execution pipeline of the processor device, wherein the plurality of uncommitted instructions comprises the uncommitted instruction.

13. The method of claim 12, wherein a count of the plurality of SROB slice entries of each SROB slice among the plurality of SROB slices of the SROB equals a count of the plurality of ROB entries.

14. The method of claim 12, wherein:
a count of the plurality of SROB slice entries of each SROB slice among the plurality of SROB slices of the SROB is less than a count of the plurality of ROB entries; and
allocating the SROB slice entry comprises:
- determining that no SROB slice entry among the plurality of SROB slice entries of the SROB slice is available for allocation; and
- responsive to determining that no SROB slice entry among the plurality of SROB slice entries of the SROB slice is available for allocation:
  - initiating a stall of the execution pipeline of the processor device; and
  - allocate the SROB slice entry responsive to resolution of the stall.

15. The method of claim 12, wherein:
a count of the plurality of SROB slice entries of each SROB slice of the plurality of SROB slices of the SROB is less than a count of the plurality of ROB entries; and
allocating the SROB slice entry comprises:
- determining that no SROB slice entry among the plurality of SROB slice entries of the SROB slice is available for allocation; and
- responsive to determining that no SROB slice entry among the plurality of SROB slice entries of the SROB slice is available for allocation, allocating the oldest SROB slice entry.

16. The method of claim 15, wherein restoring the plurality of RMT entries to the corresponding plurality of prior mapping states comprises:
- determining, while performing a walk of the SROB slice, that overwritten contents of the oldest SROB slice entry are necessary for flush recovery; and
- responsive to determining that the overwritten contents of the oldest SROB slice entry are necessary for flush recovery, restoring the plurality of RMT entries to the corresponding plurality of prior mapping states further based on a walk of the ROB.

17. The method of claim 12, wherein:
a count of the plurality of SROB slice entries of each SROB slice of the plurality of SROB slices of the SROB is less than a count of the plurality of ROB entries; and allocating the SROB slice entry comprises:
   determining that no SROB slice entry among the plurality of SROB slice entries of the SROB slice is available for allocation; and
   responsive to determining that no SROB slice entry among the plurality of SROB slice entries of the SROB slice is available for allocation:
      evicting an oldest SROB slice entry of the plurality of SROB slice entries of the SROB slice to a partially serial ROB (PSROB); and
      allocating the oldest SROB slice entry.

18. The method of claim 17, wherein restoring the plurality of RMT entries to the corresponding plurality of prior mapping states comprises:
   determining, while performing a walk of the SROB slice, that overwritten contents of the evicted oldest SROB slice entry are necessary for flush recovery; and
   responsive to determining that the overwritten contents of the evicted oldest SROB slice entry are necessary for flush recovery, restoring the plurality of RMT entries to the corresponding plurality of prior mapping states further based on a walk of the PSROB.

19. A non-transitory computer-readable medium, having stored thereon computer-executable instructions that, when executed by a processor device, cause the processor device to:
   detect an uncommitted instruction within an execution pipeline of the processor device, the uncommitted instruction comprising a write instruction to a destination logical register number (LRN) among a plurality of LRNs, wherein the processor device comprises a reorder buffer (ROB);
   allocate, to the uncommitted instruction, a sliced reorder buffer (SROB) slice entry among a plurality of SROB slice entries of an SROB slice corresponding to the destination LRN among a plurality of SROB slices of an SROB of the processor device, wherein each SROB slice of the plurality of SROB slices is configured to track only uncommitted instructions that write to a respective LRN among the plurality of LRNs;
   receive an indication of a pipeline flush from a target instruction within the execution pipeline; and
   responsive to receiving the indication of the pipeline flush, restore a plurality of rename map table (RMT) entries of an RMT to a corresponding plurality of prior mapping states, based on sequential accesses, performed in parallel, of the plurality of SROB slices corresponding to LRNs of the plurality of RMT entries.

20. The non-transitory computer-readable medium of claim 19, wherein:
   the plurality of RMT entries comprises a respective plurality of program order identifiers; and
   the computer-executable instructions cause the processor device to restore the plurality of RMT entries to the corresponding plurality of prior mapping states further based on the plurality of program order identifiers of the plurality of RMT entries.

* * * * *